United States Patent [19]

Chernuchin et al.

[11] Patent Number: 5,046,197
[45] Date of Patent: Sep. 10, 1991

[54] MOLDED PLASTIC BELT AND BUCKLE

[75] Inventors: Michael Chernuchin, New York, N.Y.; Richard Satin, Swampscott, Mass.

[73] Assignee: Fashion Technologies, Inc., New York, N.Y.

[21] Appl. No.: 464,947

[22] Filed: Jan. 16, 1990

Related U.S. Application Data

[62] Division of Ser. No. 276,677, Nov. 28, 1988.

[51] Int. Cl.$^5$ .................................................. A41F 9/00
[52] U.S. Cl. .......................................... 2/322; 2/312; 2/321; 2/311; 2/323; 24/163 K; 24/182
[58] Field of Search ................... 2/311, 312, 322, 257, 2/321, 323; 24/182, 163, 163 F–163 K; 264/293; 425/385

[56] References Cited

U.S. PATENT DOCUMENTS

| 545,447 | 9/1895 | Bringham | 24/182 |
|---|---|---|---|
| 1,833,175 | 11/1931 | Pollock | 2/322 |
| 2,837,748 | 6/1958 | Manning | 2/323 |
| 3,017,641 | 1/1962 | Stollman | 24/163 R |
| 3,913,147 | 10/1975 | Ostrander | 2/311 |
| 4,110,139 | 8/1978 | Mashida | 264/293 |
| 4,256,135 | 2/1981 | Orsini | 425/385 |
| 4,406,043 | 9/1983 | Friedman | 24/182 |
| 4,521,923 | 6/1985 | Mackey | 2/339 |

FOREIGN PATENT DOCUMENTS 2530128  7/1982  France ............................. 24/163 K Primary Examiner—Andrew M. Falik
Assistant Examiner—Bibhu Mohanty
Attorney, Agent, or Firm—Amster, Rothstein & Ebenstein

[57] ABSTRACT

A belt designed to simulate the appearance of an expensive leather belt comprises a belt strap to form exclusively of molded plastic and having its front face and edge substantially uniformly machine finished. A fastener is secured to the belt strap adjacent one end thereof for operatively fastening the one strap end to the other strap end.

9 Claims, 7 Drawing Sheets

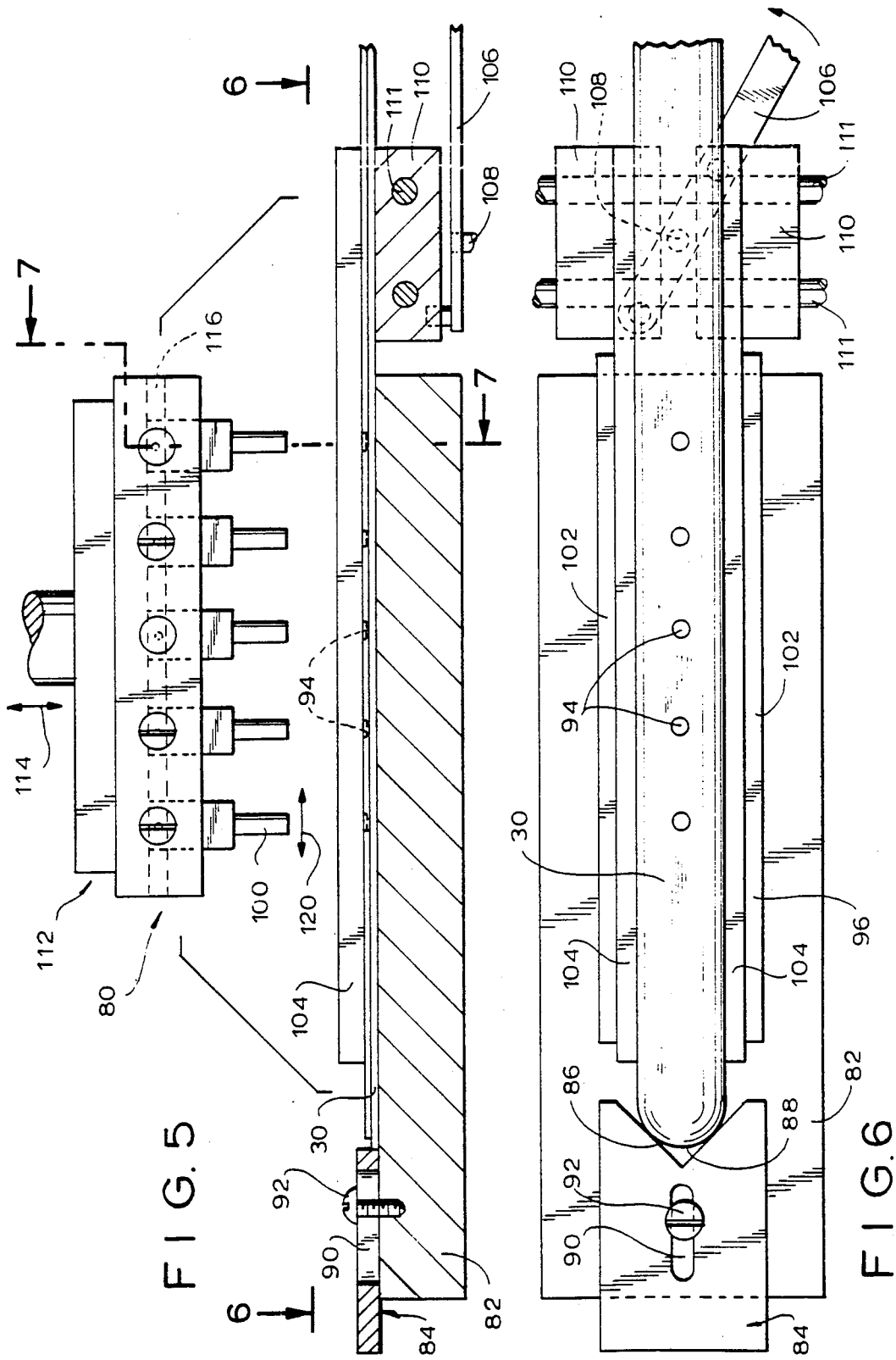

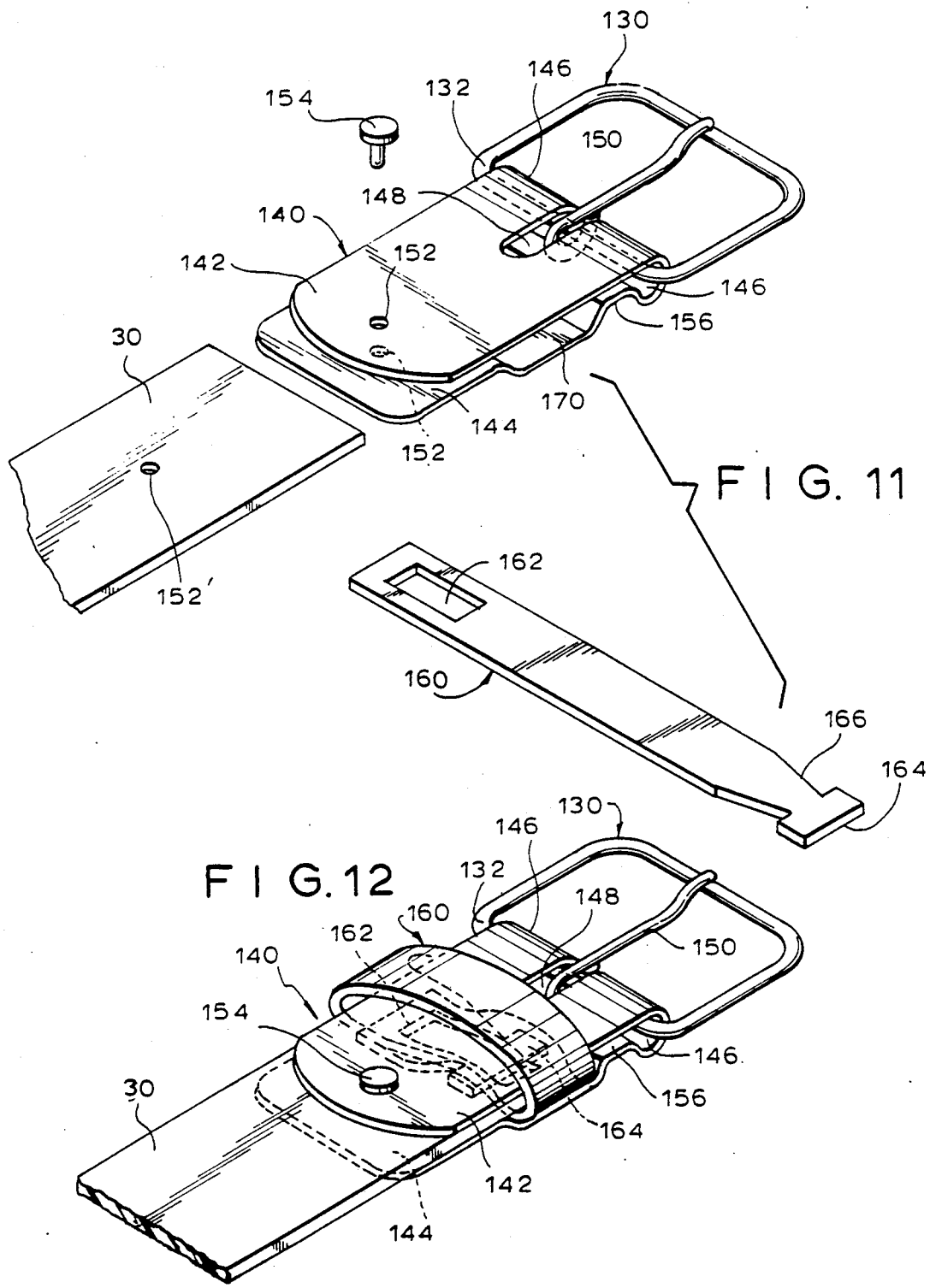

MOLDED PLASTIC BELT AND BUCKLE

This is a divisional of co-pending application Ser. No. 07/276,677, filed on Nov. 28, 1988.

BACKGROUND OF THE INVENTION

The present invention relates to belts, and more particularly concerns an inexpensive plastic belt designed to simulate the appearance of an expensive leather belt.

It has long been a goal of belt manufacturers to be able to produce an inexpensive belt made at least partially of plastic which simulates the appearance of an expensive leather belt. While there have been commercially successful attempts to produce such belts from composite materials, such as plastic with a backing of bonded leather (i.e., an amalgam of leather scrap, paper and glue) or similar material secured thereto, the labor-intensive manufacturing process used in such attempts does not permit the overall belt costs (including material and manufacturing costs) to be reduced as much as desired despite the reduction in the cost of materials. It is believed that these efforts failed, first, to make the belt strap exclusively of plastic and, second, to utilize cost-saving manufacturing techniques necessary to enable such a belt to be produced extremely inexpensively without compromising its aesthetic quality. A further disadvantage of the belts made from composite materials is the tendency of the straps to delaminate, with separation of the plastic and the backing.

Accordingly, it is an object of the present invention to provide an inexpensive belt simulating the appearance of an expensive leather belt strap, but having an inexpensive belt strap formed exclusively of molded plastic.

It is also an object to provide such a belt with apparatus for quickly and inexpensively connecting the buckle and the belt strap.

It is a further object to provide such a belt with a belt loop which can be quickly and inexpensively assembled and put in place without requiring labor-intensive sewing or stapling.

SUMMARY OF THE INVENTION

It has now been found that the objects of the present invention are obtained in a belt designed to simulate the appearance of a leather belt and comprising a belt strap and fastening means. The belt strap is formed substantially exclusively of molded plastic and has its front face and edge substantially uniformly machine finished. The fastening means is secured to the belt strap adjacent one end thereof for operatively fastening the strap end to the other strap end.

In a preferred embodiment, the front face and edge of the belt strap are molded with substantially identical surface detail to the leather belt, and the back face of the belt strap is also molded with surface detail. The plastic is modified polyvinyl chloride, preferably modified polyvinyl chloride material comprising 40–85% polyvinyl chloride resin, 0–45% filler and 10–30% by weight plasticizer. The plastic material is characterized by a softening point below 380° C. and is energy absorbing in the radio frequency range.

Preferably the strap is characterized by a density of 1.1–1.5 g/cc, a gauge of 0.05–0.15 inch, an ultimate tensile strength of 2,000–6,000 psi, an ultimate elongation of 150–450%, a 100% modulus of elongation of 1,000–3,000 psi, a Shore "A" hardness of 80–99 initially and 75–95 after 15 seconds, and a Graves tear resistance of 200–500 lbs/in.

The present invention further encompasses, as an intermediate in the manufacture of a molded plastic belt designed to simulate the appearance of a leather belt, a device for the simultaneous transport of a plurality of belt straps from a molding system and into and from a finishing system. The device comprises a sheet of release material defining a carrier and a plurality of belt straps of molded plastic material having their back faces secured to the front face of the carrier for movement therewith as a unit.

In a preferred embodiment of the device, the belt straps are parallel to and closely spaced from adjacent belt straps along their elongated sides. After transport into and before transport from the molding system, the belt straps are molded on a back face with surface detail imparted by the carrier. Typically the carrier carries 10–20 of the belt straps.

The present invention further encompasses a method of manufacturing molded plastic belts designed to simulate the appearance of leather belts. In a single mold, a plurality of belt straps are molded front face down from a moldable plastic material, and a sheet of release material is removably secured to the exposed back faces of the belt straps. The release sheet is then used as a carrier for the removal of the plurality of belt straps from the mold and for the transport of the plurality of belt straps through a finishing system. Finally, the release sheet and the plurality of belt straps are separated, and the separated belt straps are assembled with belt accessories.

In a preferred embodiment, the mold imparts a desired pattern of surface detail substantially uniformly to the front face and edge of each belt strap, and the release sheet imparts a desired pattern of surface detail to the rear face of each belt strap. The front face and edge of each belt strap are uniformly machine finished in the finishing system while the back faces of the belt straps are still attached to the release sheet. Typically, the release sheet carries 10–20 of the belt straps.

During the molding step each belt strap is molded with a plurality of visible latent belt holes for receiving the prong of a belt buckle accessory so preferably, after separation of the release sheet and the belt strap, the individual punches of a belt hole puncher are longitudinally positioned along the length of the belt strap to vertically align with the visible latent belt holes and then the puncher simultaneously punches out of the belt strap the visible latent belt holes.

The present invention further encompasses apparatus for connecting the back bar of a buckle to one end of a belt strap. The connector comprises a metal strip folded back on itself to define a pair of generally parallel front and rear panels and a bight connecting the panels. The strip is adapted to receive therein against the bight the back buckle bar and intermediate the panels the belt strap end. Each of the panels contains a rivet aperture therethrough adjacent the free ends thereof, the rivet apertures being aligned and adapted to receive a rivet passing through the belt strap end to operatively join the buckle and the belt strap end.

In a preferred embodiment, the bight and the adjacent ends of the panels together define an open central longitudinal slot enabling a buckle prong to freely pivot on the back buckle bar. The connector additionally includes a rivet extending through the one belt strap end and engaging the rivet apertures of the panels for operatively joining the connector and the one belt strap end.

The present invention further encompasses a belt designed to simulate the appearance of a leather belt comprising a belt strap, buckle means operatively connected to the belt strap adjacent one end thereof for operatively fastening the one strap end to the other strap end, and the aforementioned connector apparatus operatively connecting the one belt strap end and the buckle means.

In a preferred embodiment, the belt includes a belt loop having interengaging end portion. The rear panel of the connector apparatus defines a rearwardly extending recess intermediate the bight and the rivet aperture, with the belt loop being disposed around the front panel with its end portions interengaged and disposed intermediate the rear panel and the belt strap in the recess. The recess is configured and dimensioned to assist in maintaining the interengaged end portions of the belt loop interengaged. More particularly, one of the belt loop end portions defines an aperture and the other of the belt loop end portions defines a full width tip and a restricted width neck, the end portions being interengaged by having the loop neck within the loop aperture. The loop tip is flexible and must be flexed to be inserted through the loop aperture.

BRIEF DESCRIPTION OF THE DRAWING

The above brief description, as well as further objects and features of the present invention, will be more fully understood by reference to the following detailed description of the presently preferred, albeit illustrative, embodiments of the present invention when taken in conjunction with the accompanying drawing wherein:

FIG. 5 is a fragmentary side elevation view of a belt hole puncher about to punch holes in a belt held in a jig according to the method of the present invention;

FIG. 6 is a top plan view of the belt in its jig, taking along the line 6—6 of FIG. 5;

FIG. 11 is a fragmentary exploded isometric view of the buckle end of a belt according to the present invention; and FIG. 12 is a fragmentary isometric assembly view of the buckle end of FIG. 11.

DETAILED DESCRIPTION OF THE PREFERRED EMBODIMENTS

Figure 1:
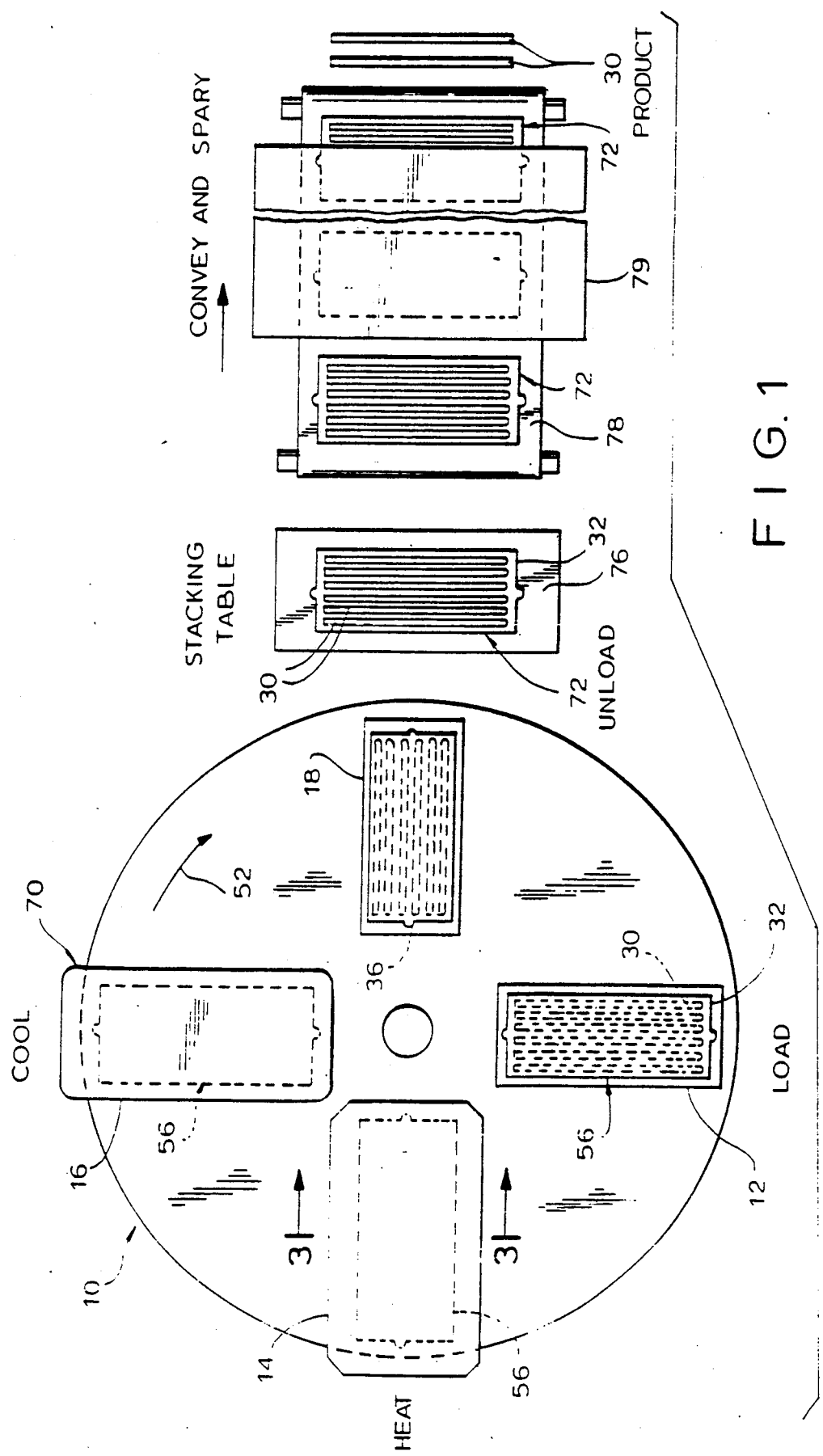
FIG. 1 is a fragmentary schematic plan view of the molding and finishing apparatus used to manufacture a belt strap according to the present invention.

The belt strap of a belt according to the present invention may be formed of any thermoplastic material affording the properties considered desirable in a belt such as high density, hardness, flexibility, thermal sensitivity and tear resistance.

The high tear resistance requirement assures that the belt holes do not tear and the belt foes not stretch, tear or crack. The flexibility and thermal sensitivity requirements assure that the belt will conform to the body. The thermoplastic material of the belt strap exhibits low stiffness and is sufficiently flexible at anticipatable room temperatures that it may be easily wrapped around and conformed to the user's waist. As it is worn and becomes further heated as a result of its proximity to the user's body, the flexibility further increases to provide additional conformity to the user's waist and hence additional comfort to the user. Preferably the material also has internal memory so that if the belt takes on a different shape during the day (for example, because the buckle prong distorts the belt strap at its hole), it will hang back to its originally manufactured shape when hung overnight. The hardness requirement assures that the belt will not bend over, out of shape, when worn. The hardness requirements must, of course, be tempered by the requirement for continuous flex and impact resistance even at low temperature and the need to simulate the "feel" of a genuine leather belt. Preferably, the material is further characterized by an ultimate tensile strength of about 2,000-6,000 psi, an ultimate elongation of 150-450%, and a 100% modulus of elongation of 1,000-3,000 psi. The material has a non-crocking formulation which assures that color is not transferred from the material to the fabric of the garment on which it is worn, thereby causing staining or damage. Because of its synthetic nature, the characteristics of the material can be especially selected to provide a mixture of the best characteristics associated with belt materials. As a result of the materials used and its mode of construction, the belt strap is virtually indestructible and incapable of delamination.

Preferably, the material has a specific density of 1.1-1.5 g/cc, a gauge or thickness of 0.05-0.15 inch, a Shore "A" hardness of 80-99 initially and 75-95 after 15 seconds, and a Graves tear resistance (ASTM D-624 Die C) of 200-500 lbs/in. As the material will eventually be molded, it is important that it be capable of absorbing energy in the range employed in the molding operation; for example, if the molding operation employs energy in the radio frequency range, the material must be energy absorbing in that range. The material is preferably characterized by a softening point of below 380° C., the low softening point requirement ensuring that the heating step of the molding cycle will be of short duration, with maximum reformation of the material surface occurring in the shortest possible time.

A preferred plastic for the material is modified polyvinyl chloride (PVC), the particular modifiers and the quantities in which they are used being adjusted to provide the aforementioned desirable qualities in the belts under the hereinafter stated conditions of manufacture. A preferred modified polyvinyl chloride material comprises virgin polyvinyl chloride with stabilizer, plasticizer and reinforcing filler added. A low temperature plasticizer is preferred. While the amounts of resin, filler, and plasticizer may vary greatly, a preferred composition comprises 40-85% PVC resin, 10-30% plasticizer, and 0-45% by weight filler. Stabilizers are incorporated as required. Especially preferred resins have softening points of 260° to 380° C. and include polyvinyl chloride homopolymer and copolymers of one or more of vinyl chloride/vinyl acetate, vinyl chloride, and vinylidene chloride. Preferred plasticizers include phthalates, adipates, sebacates, epoxidized phosphates, trimellitates, and phthalyl glycolates. Preferred fillers include calcium carbonate, barium sulfate, aluminium silicate, magnesium silicate, and calcium silicate.

The plastic material may be provided as a thin, rectangular sheet from which the pre-molding operation belt straps are precision cut as male portions to fit into corresponding female portions of the mold. The precision cutting of the sheet to form pre-molding operation belt straps is preferably performed by a rotary die cutter because the material to be cut is so thick and tough, and the surfaces to be cut is so large, that the durability of the die is a matter of concern. Hence, a heavy duty Teflon-coated steel is preferably used. A rotary die cutting unit relieves the die of having to cut through so much surface area at one time. The die is provided with a center edge bevel so as to apply equal pressure to either side of the cuts used to form the belt straps so that, upon impact by the cutter, the straps have room to move to each side so the blade can cut through. The belt straps are preferably cut slightly narrower (about 1/32 inch) and slightly shorter (about 0.5 inch) than the female portions of the mold which will receive the straps, thereby enabling the straps to be easily fitted and placed into the female portions of the mold cavity. The buckle end of the belt strap is typically transverse (i.e., perpendicular) to the longitudinal axis of the belt strap, while the other end (i.e., the usually apertured end) may be curved, tapered, trapezoidal or otherwise shaped, as appropriate, either for aesthetic reasons or to facilitate passage of the belt end through the buckle. Alternatively, the basic pre-molding operation belt straps may be formed directly by extrusion of the plastic material to the desired thickness, width, length, and shape.

Where the profile of the molded belt strap 30 (that is, its cross-section) will be relatively flat, the pre-molding operation belt strap 30 is preferably die cut to an appropriate length and width from flat sheet stock. However, where the finished belt is to have a strongly contoured profile (see FIGS. 8B, 9B and 10B), stock having an extruded profile broadly compatible with the width and contour of the intended mold cavity is preferred.

Typically a solid 100 mil PVC sheet or extrusion is used.

Referring now to the drawing, and in particular FIG. 1 thereof, therein illustrated is molding and finishing apparatus according to the present invention. Briefly speaking, the apparatus includes a four station rotary conveyor or table for transporting the product through molding operation, an optional stacking table, and a linear conveyor for transporting the product through a finishing operation.

More particularly, the rotary conveyor or carousel table, generally designated by the reference numeral 10, is adapted to carry a product in series through four stations: a loading station 12, a heating station 14, a cooling station 16, and an unloading station 18. A preferred rotary conveyor including the four stations and adaptable for use in the present invention is a Compo-Fit H. F. Model M--Four Station Flow Molding Process machine made by Compo Industries, Inc. of Waltham, Mass. Obviously a linear conveyor can be substituted for the rotary table 10, with the stations disposed along the length of the conveyor pathway, or a conveyor may be dispensed with entirely and the product moved from station to station manually, albeit with a great loss of efficiency.

Figure 2:
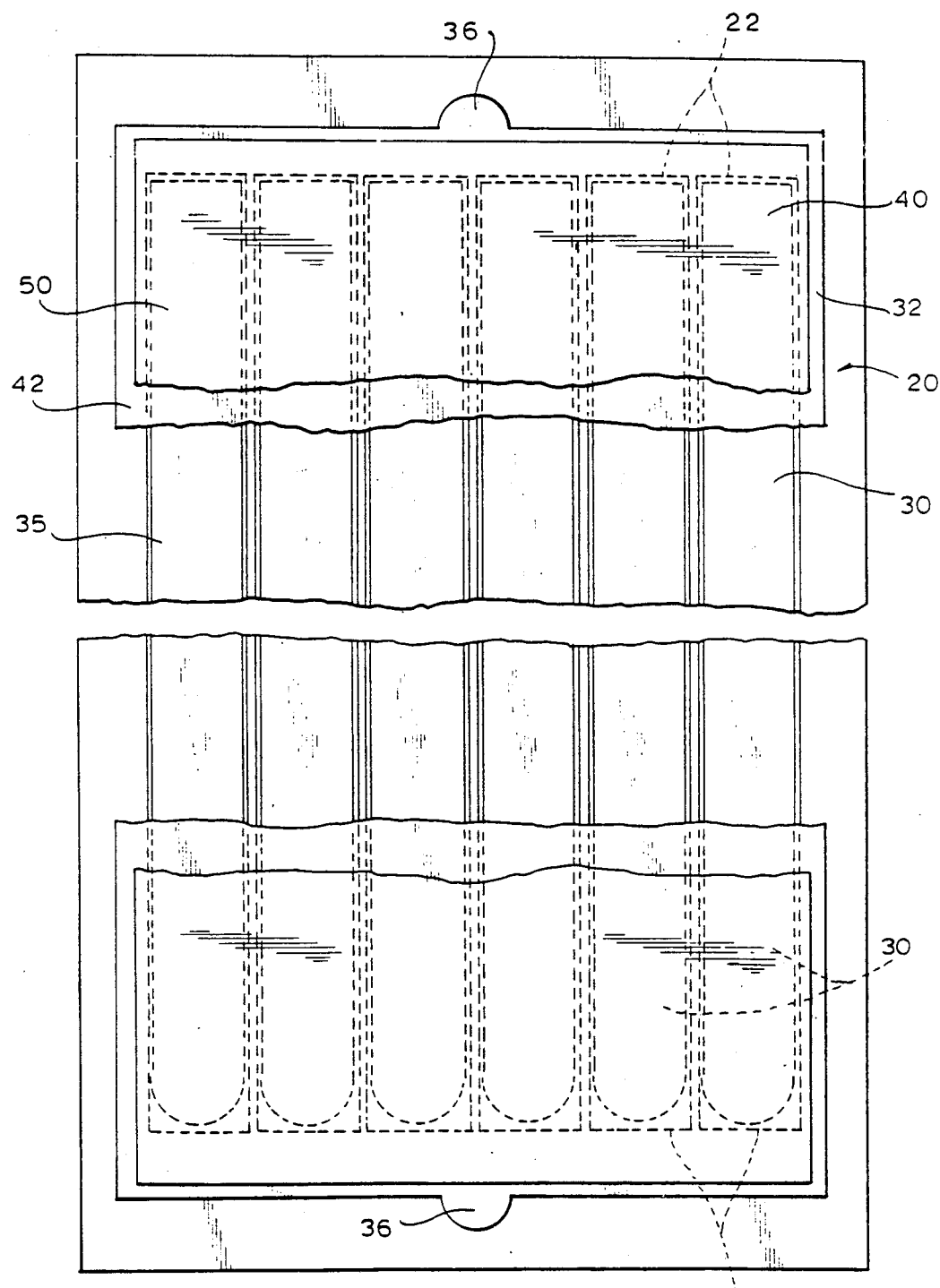
FIG. 2 is a fragmentary top plan view of the mold assembly used in the molding of the leather straps of the present invention, with portions thereof removed to reveal details of internal construction.
Figure 3:
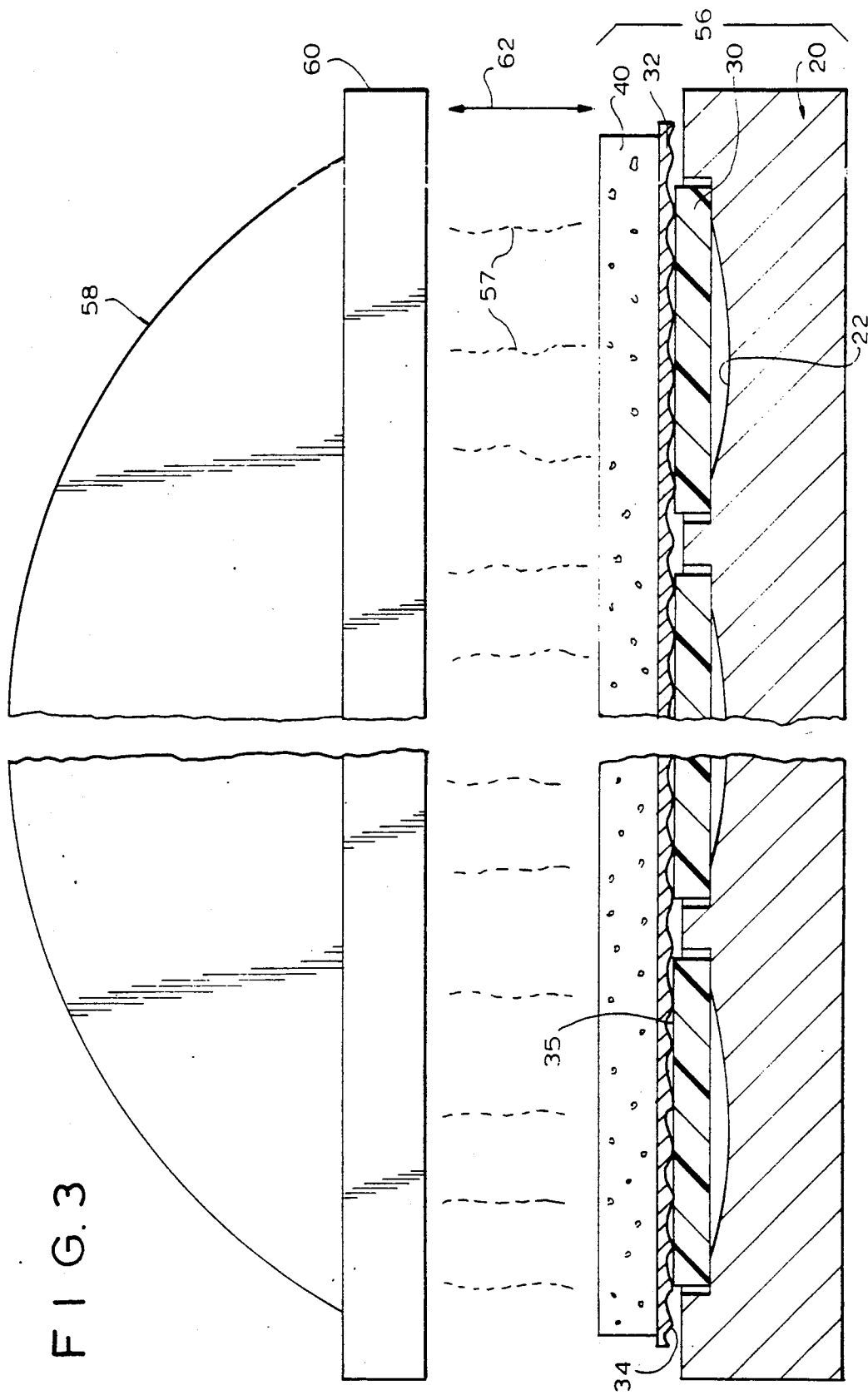
FIG. 3 is a fragmentary sectional view, to a greatly enlarged scale, taken along the line 3—3 of FIG. 1.
Figure 4A:
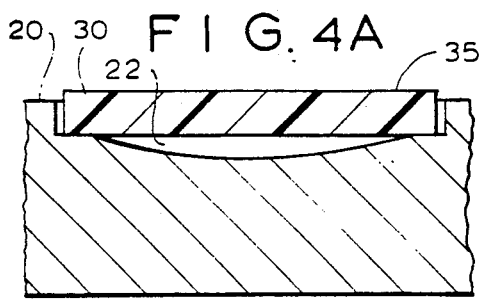
FIGS. 4A through 4H are fragmentary sectional views illustrating the belt strap as it passes through the various steps of the molding operation.

Referring now also to FIGS. 2, 3 and 4A, therein illustrated is a mold 20 having a plurality of mold cavities 22 in parallel side-by-side disposition for receipt of the pre-molding operation belt straps 30 therein. The individual cavities 22 are preferably in close proximity, separated only by about 0.25 inch, so to minimize the size of the heating station 14 and cooling station 16 required for the mold 20 as well as other reasons which will be provided hereinafter relating to the finishing operation. The number of mold cavities 22 in a given mold 20—and hence the number of belt straps 30 which can be molded in single operation—is preferably selected as a compromise between the efficiency of performing the molding and other operations simultaneously on a large number of belt straps versus the increased cost of greater sized molding operation stations and the like. For illustrative purposes, FIGS. 1 and 2 illustrate a mold 20 having six mold cavities 22, but generally a mold having 10 to 20 mold cavities 22 is preferred. The mold 20 is temporarily attached to the rotating table 10 for rotation therewith. While the molds 20 (and the various stations 12, 14, 16, 18) are illustrated as radially oriented with respect to the circular table 10, clearly they may be generally circumferentially oriented instead.

The mold 20 utilized in the present invention is preferably fabricated out of castable materials, such as silicone rubber, for a variety of reasons. First, the surface detail achievable in such a mold results in almost a mirror image duplication of the belt original. A series of leather belt straps to be simulated, laid in parallel orientation, may be used to form the mold cavities 22 for the belt straps 30. The molding system faithfully recreates the exotic front and edge surfaces of leather belts having even very elaborate stitching designs, labor-intensive applications such as lacing, braiding, weaving and the like, exotic leather and reptile patterns, single and multiple doming, abstract embossed designs, floral designs, logos and intermingled mixtures of all of these different design elements, all at a fraction of the cost of the original. A second reason for using castable molds is the ease, speed and economy with which such molds are produced. In the fashion world, where the first person on the market in mass production may achieve a dominant position, the speed of producing sample production molds is an important consideration. Typically, castable production molds can be made in one week, whereas metal molds may take ten weeks or longer. Furthermore, the castable mold costs only a fraction of the cost of a steel mold, typically about 5-10%. While the castable mold has a considerably more limited operative life than the steel mold, this too can be an advantage as it permits an inexpensive castable mold to be individualized (perhaps with a company logo or a name) and then discarded after as few as 50 uses.

At the loading station 12, the pre-molding operation belt straps 30 are placed in the mold cavities 22, one belt strap 30 per cavity 22. The belt straps 30 fit loosely within the mold cavities 22 both laterally (as best seen in FIG. 4A) and longitudinally (as best seen in FIG. 2), thereby to facilitate insertion and removal of the belt straps 30, by providing a scant of about 0.016% (about 1/64 inch on each side). Alternatively, the belt straps 30 may be formed in the mold from a liquid plastisol poured into each mold cavity 22.

Figure 4E:
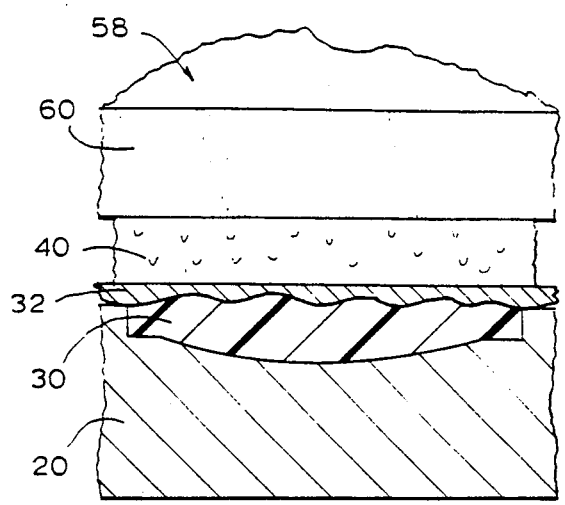
Figure 4B:
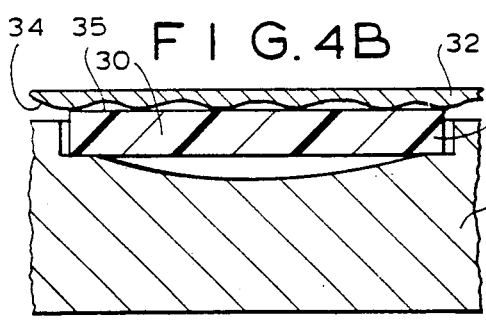

Referring now in particular to FIGS. 2, 3 and 4B, after the various pre-molding operation belt straps 30 have been placed front face downward in their respective mold cavities 22 at the loading station 12, a sheet 32 of release material (e.g., release paper) is placed over all the mold cavities 22 so that the bottom surface 34 of the release sheet 32 rests on the upper surface 35 of each belt strap 30. The release sheet 32 preferably covers the entire area occupied by the mold cavities 22 and may extend preferably somewhat beyond. For convenience, an outwardly projecting tab 36 may extend from each end thereof, as shown, from each side thereof, or both.

Typically release papers comprise a base sheet (e.g., a blend of bleached sulfate kraft pulp) provided with at least one first casting, conventionally referred to as a base coating, and a release casting overlying the base coating. The base coating typically comprises a pigment or filler, such as a coating grade clay, together with an adhesive binder. The purpose of the base coating is to level and seal the surface. The pigment in the coating provides a smooth surface by masking the irregularities in the surface of the base sheet, and the adhesive binds the pigment and prevents undue penetration into the base sheet by the subsequently applied release coating. The base coating thereby maximizes the effectiveness of the release coating applied by preventing penetration of the release coating into the base sheet. The release coating contains silicone release agents that provide varying degrees of release properties depending on the specific purpose for which it is being used. These release coatings are characterized by their ability to separate intact from a surface which would normally be adherent.

For reasons that will become apparent hereinafter, the material employed for the release sheet 32 must exhibit high heat resistance, high strength and thermal expansion compatibility as well as release properties (that is, the ability of the lower surface 34 of the release sheet 32 and the upper surface 35 of the belt straps 30 to be peeled apart after the molding and finishing operations). More particularly, the release sheet 32 should be sufficiently strong that it will not tear when carried by the tabs 36, even when it supports the full weight of the belt straps 30. Further, while the release sheet 32 must exhibit the desired easy desired peelability from the belt straps 30, the engagement therebetween produced by the molding operation must be sufficient to enable the release sheet 32 to support the belt straps 30 therebelow in the absence of any substantial effort to peel the belt straps 30 and release sheet 32 apart. Still further, the release sheet 32 must be transparent to the energy used to heat the belt straps during the molding operation, for example, RF-transmissive where RF energy is used for molding. Finally, the release sheet 32 must be capable of withstanding the temperatures encountered during the molding operation, and in particular at the heating station 14, while retaining the aforementioned desired peelability, strength and engaging characteristics upon cooling. A preferred material for release sheet 32 is EHR grade from S. D. Warren Co.

Typically a release sheet is designed to have high release properties (that is, high peelability) with little, if any, engaging or tack properties. Accordingly, in order to provide the desired balance of peelability and engagability desired in the release sheet of the present invention, it has been found that a release sheet previously used in an operation which left it slightly tacky may be employed to provide the desired balance, and to do so at a reduced cost relative to new release sheets. The release sheet 32 is typically not reusable after use in the present invention due to its contamination during the finishing operation.

The downwardly facing undersurface or release casting 34 of the release sheet 32 may be planar or flat where it is not desired to impart surface detail to the upwardly facing back face 35 of belt strap 30 corresponding to the belt backing 35 (i.e., the back or inner surface of the belt strap 30). On the other hand, typically the undersurface 34 will have a pattern of surface detail so as to impress upon the belt backing 35 a simulation of leather grain. In this instance, the undersurface 34 of release sheet 32 is provided with a pattern of surface detail (illustrated in FIGS. 3 and 4 as a wavy surface) so as to impart a desired complementary or reverse pattern of surface detail to the upwardly facing surface or backing 35 of the belt strap 30 during the molding operation (see FIG. 4E). Thus, the release sheet 32 can perform dual functions, acting both as a carrier and an embosser.

Figure 4F:
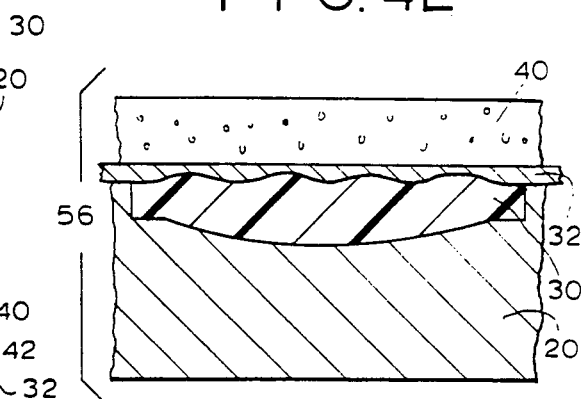
Figure 4C:
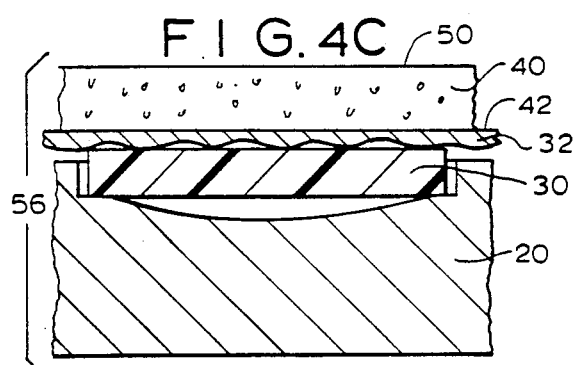

Referring now to FIGS. 2, 3 and 4C in particular, while still at the loading station 12, optionally a cushioning layer 40 is placed over the upper surface 42 of the release sheet 32 to continuously apply pressure forcing the belt straps 30 into the mold cavities 22 during the heating step. (For clarity of illustration, the cushioning layer 40 is not shown in FIG. 1.) The cushioning layer 40 is compressible and may be a natural or artificial sponge or foam material, such as a natural sponge, foam rubber or compressible foam plastic, about ¼ to ¾ inch thick, which is not adversely affected by the heat cycling of the molding operation. The cushioning layer 40 is substantially transparent to the heating medium employed during the molding operation, typically radio frequency waves, and is typically, although not necessarily, reusable.

The assembly 56 thus formed—comprised of the mold 20, the belt straps 30, the release sheet 32 and the cushioning layer 40—leaves the loading station 12, passes through the heating and cooling stations 14, 16, and enters the unloading station 18 as a unit. Referring again to FIG. 1, the loading operation taking place at the loading station being completed, the table 10 is rotated in the direction of arrow 52 to bring assembly 56 (including mold 20, belt straps 30, release sheet 32, and cushioning layer 40) to a conventional mold heating station 14. Typically, the table rotation would be 90° for a four station table as illustrated.

Referring now to FIGS. 3 and 4E in particular, at the heating station 14 assembly 56 is heated by energy waves 57, typically radio frequency energy waves, produced by an energy source (not shown) in a conventional oven or heating tunnel, generally designated 58, to produce within the belt straps 30 a temperature at least slightly above their softening temperature. The power setting of the radio frequency energy generated (that is, the power source) and the period during which the power is on are adjustable to this end. About 40 seconds are typically required for the heating cycle, although this will depend upon the particular equipment used, the material, thickness and surface area of the belt straps to be molded, the density, thickness and nature of the materials employed in the equipment, the degree of surface definition or detail required for a particular belt style, etc. A preferred energy source generates radio frequency waves, although alternatively energies of other frequencies may be employed.

The oven or heat tunnel 58 has as its lower aspect a metal plate 60 which is substantially rigid and substantially transparent to the energy employed during the molding operation, typically radio frequency waves. The plate 60 is adjustable between two vertically displaced positions, as indicated by arrow 62 of FIG. 3. In the elevated position illustrated in FIG. 4D, the oven 58 enable the assembly 56 to pass through the heating station 14; in the lowered or bearing position illustrated in FIG. 4E, the metal plate 60 of oven 58 exerts a downward pressure of on the upper surface 50 of the cushioning layer 40. While assembly 56 is in the heating station 14, the metal plate 60 is lowered so that the combination of heat (from the energy field) and pressure (from the lower aspect 60) causes the various surfaces of the thermoplastic belt straps 30 to softer, thereby assuming on the downwardly disposed front and the side-facing edge the configuration of mold cavity 22 and on the upwardly disposed backing the configuration of the release sheet undersurface 34. As customary in molding operations, a broad range of temperatures and pressures may be used, higher temperatures generally requiring lesser pressures and lower temperatures generally requiring higher pressures.

Referring again to FIG. 1, after the heating operations are completed at heating station 14 and the metal plate 60 of oven 58 returned to its elevated position, the table 10 is further rotated in the direction of arrow 52 (another 90°, as shown for a four-station table) until the assembly 56 is brought into a conventional cooling tunnel 70 at the cooling station 16. Chilled air is directed onto the assembly 56 until the molded belt straps 30 are cooled to a temperature sufficiently below their softening point that they will retain their shape upon removal from the mold 20. The required dwell time at the cooling station 16 is longer then any of the dwell times required at the other stations 12, 14, 18 and thus determines the dwell time at each station and so the overall molding operation cycle time, although the actual heating at heat station 14 occurs only for a shorter period.

Figure 4G:
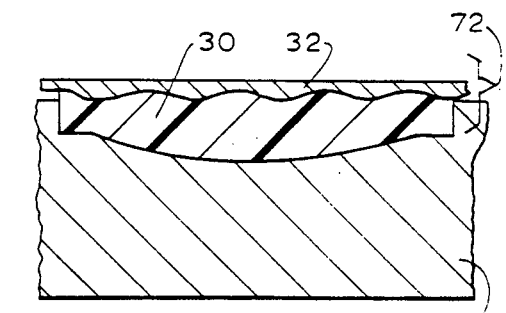
Figure 4D:
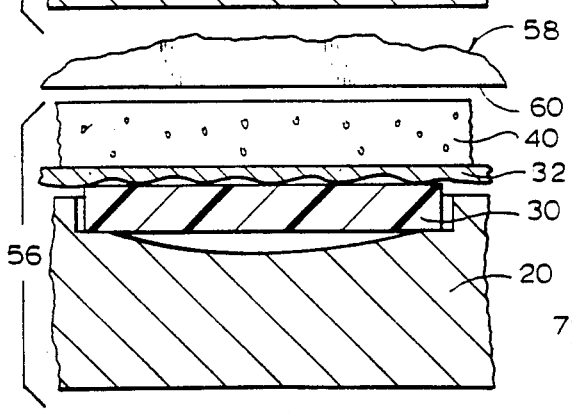
Figure 4H:
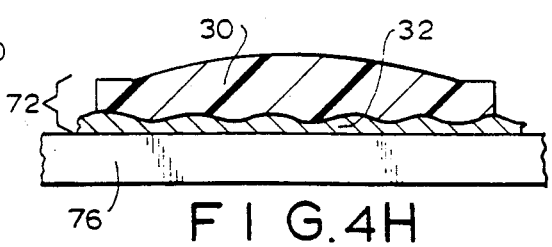

After the cooling operation is completed at the cooling station 16, the table 10 is rotated in the direction of arrow 52 (another 90°, as shown for a four-station table) until the assembly 56 reaches the unloading station 18. Referring now to FIG. 4F in particular, at the unloading station 18, the cushioning layer 40 is removed (and saved for re-use) to leave only the release sheet 32 sitting atop the molded belt straps 30 in the mold 20, as shown in FIG. 4G. The subassembly, generally designated 72 and comprised of a release sheet 32 and the molded belt straps 30 depending therefrom, is then lifted (optionally by release sheet tabs 36) to remove the belt straps 30 from the mold cavities 22 of mold 20. The subassembly 72 is then turned over so that the belt straps 30 are on top of the release sheet 32 with the molded front and edge surfaces of the belt straps 30 exposed and the backing of the belt straps 30 still in contact with the release sheet 32. The subassembly 72, after removal from mold 20, may be stored temporarily on a stacking table 76 (see FIGS. 1 and 4H), shipped away to a remote finishing plant, or directly placed on a linear conveyor 78 for transport through a semi-automated mechanical finisher 79.

Referring to FIG. 1 again after removal of the subassembly 72 from the mold 20, the plurality of belt straps 30 and release sheet 32 thereof may be transported to a finishing operation, finished, and removed from the finishing operation, all as part of the unitary one piece subassembly 72. The finishing operation substantially uniformly applies to the front and edge of each belt strap 30 various special print effects, inks, paints, dyes, lacquers, glazes, and topcoats as required to provide a high level of aesthetic appearance generally found only on very expensive genuine leather belts.

Belt straps 30 are carried through the finisher 79 by the linear conveyor 78 on release sheet 32, parallel to one another, about 0.25 inch apart, with the front surface up. As already noted, the mold cavities 22 are about 0.25 inch apart from one another precisely to produce this desired spacing between the belt edges, thereby to insure that there is sufficient space between the belt edges to enable finishing of the edges (as well as the fronts) while at the same time minimizing the waste of any lacquers, paints, dyes, inks, glazes, or the like being applied to the molded belt straps during the finishing operation. Depending upon the size of the finishing tunnel 79 and the conveyor 78, a plurality of subassemblies 72 may be processed simultaneously in side-by-side disposition. Except for the fact that the inks, dyes, top coat lacquers, glazes, paints, and other materials applied must be compatible with the plastic material of the belt straps 30, finishing of the belt straps 30 of the present invention is identical to finishing of genuine piece goods, with the results being almost indistinguishable. (By way of contrast, however, in the case of genuine leather belt straps the finishing operation is typically performed on leather hides before they have been cut into belt straps, not after. Thus, after the leather hides have been cut into leather straps the edges of the straps must be finished, typically by hand in a time-consuming and labor-intensive operation avoided in the present process.) Where necessary, the finishing tunnel 79 may include one or more curing or drying elements (not shown) to ensure that the belt straps 30 are completely dry as they emerge from the finishing tunnel. The finishing tunnel may provide a series of coat-and-dry operations, if desired.

The linear conveyor 78 is preferably apertured (for example, formed of chicken wire) so that the excess fluid of the various sprays will pass through the conveyor and collected in a water bath therebelow, thus preventing a build up of spray material, such as dye or lacquer on the conveyor 78. The various sprays may be applied by conventional spray heads. Six station rotary spray heads are particularly suitable as the configuration of the spray heads may thus be varied to provide special effects. In a typical conveyor, the first or upstream spray system applies dyes and inks to the belt straps, after which the straps pass through an oven (for example, a gas-fired curing oven maintained at 225°–400° F.) to drive the solvent vehicle out of the dyes and inks sprayed onto the belt straps. Then the belt straps pass through a second or downstream spray system which applies a lacquer (e.g., a high gloss or dull clear lacquer) to the belt straps o lock in the color and provide the straps with a desired "feel" and luster, after which the straps pass through a second oven to drive the solvent vehicle from the lacquer top coat on the straps. Both ovens are preferably provided with exhaust ducting for removal of the vaporized solvents.

As in the unloading step of the molding operation, the use of a subassembly 72—which simultaneously transports a release sheet 32 and a large plurality of the belt straps 30 as a single integral unit through an operation—enables the finishing operation to be performed at a fraction of the cost and time of sequentially finishing the same number of belt straps individually.

As the subassembly 72 emerges from the finishing tunnel 79 on the conveyor 78, the subassembly 72 may be removed from the conveyor 78 and the now fully molded and finished belt straps 30 may be stripped off the release sheet 32, ready for the assembly operation. The release sheet 32 is typically discarded at this point as it contains residues from the finishing operation.

As earlier noted, the molds 20 are preferably cast using existing genuine leather belts for reasons of economy, fidelity of reproduction, speed of mold production and the like. A serious disadvantage of this process, however, arises out of the fact that the belt holes—despite any attempt to fill the holes prior to the mold casting process—leave more or less visible outlines or impressions when belt straps are made using the mold. Thus, while a conventional belt strap permits the manufacturer to place the belt holes at locations of his choice, the present molded belt requires that the manufacturer places his belt holes exactly where the holes were located on the original leather belt if he wishes to remove the belt hole impressions left by the mold. Accordingly, the hole punching operation of the present invention utilizes a special puncher which automatically centers the belt relative to the individual hole punches and enables the individual hole punches to be adjusted within limits along the central longitudinal axis of the belt strap on an individual basis to secure alignment of a hole punch and a hole impression left by the molding operation.

Figure 7:
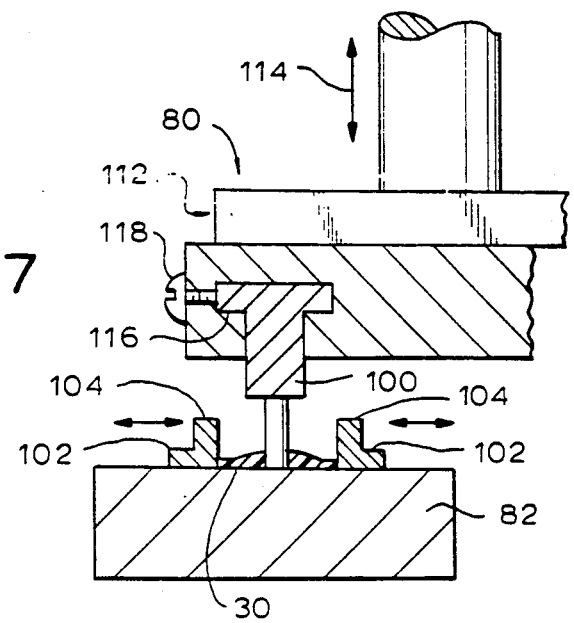
FIG. 7 is a view, partially in section, taken along the line 7—7 of FIG. 6.

Referring now to FIGS. 5-7, therein illustrated is a hole puncher generally designated 80 according to the present invention. The hole puncher 80 includes a table or flat surface 82 on which an individual molded and finished belt strap 30 may be placed for punching. Adjustably secured to the front end of the table 82 is a stop or point guide, generally designated 84, defining a V-shaped slot 86 adapted to receive and automatically position the front end or point 88 of the belt strap 30 as the point 88 is moved forwardly within slot 86. The point guide 84 includes a longitudinal slot 90 and an adjustment screw 92 passing therethrough so that the disposition of the belt strap point 88 along the longitudinal axis of the belt strap 30 may be adjusted within limits to insure that the portion of the belt strap 30 containing the hole impressions 94 is generally aligned with the series of individual hole punches 100 of the puncher 80.

In addition to the point guide 84 for longitudinally positioning the front end of point 88 of the belt strap 30, there are a pair of adjustable slides 102 with upstanding flanges 104 which are maintained in parallel disposition with respect to one another, but are movable laterally as a unit towards and away from a central axis determined by the apex of the V-shaped cut 86 and hence coincident with the central longitudinal axis of the belt strap 30. Mutual movements of the slides 102 towards and away from the central longitudinal axis of the belt are controlled by a lever 106 so that the slides 102 can be remotely spaced for receipt and removal of a belt strap 30 or brought into light contact-therewith to grasp and immobilize the portion thereof containing the hole impressions 94. As schematically illustrated in FIG. 6, the lever 106 is pivotably mounted on a fulcrum 108 and, equidistantly on either side of the pivot point defined by fulcrum 108, is pivotably secured to a respective one adjusting blocks 110. The adjusting blocks 110 are actually longitudinal extensions of slides 102 slidably mounted on a pair of transverse guides 111 to ensure maintenance of a parallel relationship between the blocks 110 and hence the slides 102. Movement of the lever 106 in one direction causes the slides 102 to move closer together, while movement in the other direction causes them to move further apart. Once the belt strap 30 has been properly positioned both longitudinally and transversely through use of the point guide 84 and adjustable slides 102, the individual hole punches are ready to be vertically aligned with the hole impressions 94.

Referring now in particular to FIGS. 5 and 7, the puncher 80 further includes a press (e.g., a standing 10 ton power press), generally designated 112 and movable upwardly and downwardly relative to table 82 as shown by arrow 114. The press 112 is movable between a raised position permitting the insertion and removal of a belt strap 30 relative to the table 82 and a lowered or punching position wherein the bottom ends of the individual punches 100 extend through the thickness of the belt strap 30. To form the belt holes, the press 112 is lowered until the individual punches 100 simultaneously punch out the hole impressions 94, thereby leaving belt holes, and then raised back to its original position.

The press 112 carries a plurality of individual punches 100 equal to the desired number of belt holes. While the punch illustrated in FIG. 5 contains only five individual punches 100, clearly a greater or smaller number of individual punches may be used. The upper ends of the individual punches 100 are disposed in a channel or pathway 116 extending along the longitudinal axis of the press 112 so that each individual punch 100 may be positioned along that longitudinal axis and then fixed there by means of a respective setscrew 118. In this manner, when the setscrews 118 are loose, the individual punches 100 can be easily and rapidly positioned (as indicated by arrow 120) for vertical alignment with the hole impressions 94, regardless of the spacing between the individual punches 100.

Once the individual punches 100 have been properly aligned and the setscrews 118 re-tightened, the individual punches 100 are in proper position for hole formation in each belt strap 30 coming from the given mold or duplicates thereof. The individual punches 100 are preferably self-cleaning and interchangeable in size (that is, diameter) so as to match or exceed the size of any hole impressions 94 formed by the molding operation. The individual punches 100 may be removed by loosening the setscrews 118 and sliding the individual punches 100 out of the channel or pathway 116 of the press 112 and replacing them with appropriate size punches 100.

Referring now to FIGS. 11 and 12 in particular, the final step in the preparation of belt according to the present invention is the connection of a buckle, generally designated 130, to the (typically unapertured) back end of the belt strap 30 so that the back end and the front end or point 88 of the belt strap 30 may be operatively fastened together. While this operation is logically the final operation in formation of the belt, it may precede the hole forming operation. The operation typically includes back hole punching of the leather strap to form the slot through which the prong of the buckle passes.

Conventionally the back end of a leather belt is folded back over the back or rear bar 132 of the buckle 130 and sewn, stapled or riveted in place. Among the obvious disadvantages of this process is the waste of expensive leather (about 3 inches of length) and the bulking of the belt about the buckle due to the double thickness of the belt strap in this area. Further, the molded plastic strap 30 of the present invention does not fold tightly about a buckle and thereby aggravates the bulking problem. While the belt of the present invention may utilize a conventional buckle and conventional means for connecting the buckle to the belt strap, a preferred embodiment of the present invention avoids each of these disadvantages of prior art belts (including the cost of back hole punching), while meeting the particular needs of a molded plastic strap, by employing a novel connector.

The connecting member, generally designated 140, comprises a metal strip folded back on itself to define a pair of generally parallel panels, a front panel 142 and a rear panel 144, and a bight 146 connecting the panels 142, 144. The bight 146 defines a central longitudinal slot 148 extending onto the panels 142, 144 so as to enable passage of the buckle prong 150 therethrough when the buckle back bar 132 is received in the bight 146 between the panels 142, 144 and subsequent pivoting of the buckle prong 150 on the buckle back bar 132. The portions of the panels 142, 144 remote from bight 146 define a pair of aligned rivet hole; 152 therethrough. The unfolded back end of belt strap 30 extends between the panels 142, 144, close to bight 146, so that when a rivet 154 is passed through the panels 142, 144 to engage the same, it extends through the belt strap 30 as well, thereby to secure the connector 140 and belt strap 30 together as a unit. The rivet 154 further draws the panels 142, 144 close together so that the bight 146 is closed off by either adjacent segment 156 of the back panel 144 or the belt strap end, thereby to preclude retreat of the buckle back bar 132 from the connector bight 146. In practice, the buckle back bar 146 is first inserted into the connector bight 146, then the belt strap end is inserted between the panels 142, 144, and finally the rivet 154 is driven home.

While a buckle 130 of metal fabrication is illustrated, clearly an all plastic molded buckle may be made according to the present invention as well, or even a metal buckle having a plastic covering. The plastic of these buckles may be color- and texture-coordinated to match the finished plastic belt strap, and indeed, made by the same process and at the same time as, or at a different time than, the belt straps.

If it is desired that each assembled belt include, as a belt accessory, a belt loop to secure the free end of the belt strap adjacent the buckle, mold 20 may be provided with appropriate mold cavities for forming a sequence of opened-up belt loop strips, generally designated 160. The backing or top surface of the belt loop strips 160 in the mold cavities are contacted by the undersurface 34 of the release paper 32 so that the molded belt loop strips 160 are carried out of the mold 20 and transported through the finishing operation in the same manner as the molded belt straps 32. If desired, the release paper 32 may also impart surface detail to the backing of the belt loop strips 160; however, this is unnecessary as the strip backing is not visible in the finished belt.

Whereas conventional loop strips are formed by joining the ends together through a sewing or stapling operation, the loop strip 160 has interlocking ends so that neither an expensive sewing operation nor a stapling operation requiring additional skilled labor and machinery is required. As best seen in FIG. 11, one end of the loop strip 160 defines a rectangular aperture 162 therethrough and the other end defines a full width tip 164 and a restricted width neck 166. As best seen in FIG. 12, in the final product the full width forward tip 164 is momentarily flexed and passed through the aperture 162 so that the restricted width neck 166 rests in the aperture 162 and the full width tip overlies a central portion of the loop 160, the interengagement of the ends closing the loop. The interengaging portions 162, 164, 166 of the loop 160 are disposed in the final product intermediate the front and rear panels 142, 144.

The connector 140 is preferably adapted to receive a molded and finished belt loop 160 by providing the rear panel 144 thereof with a rearwardly extending recess 170. Preferably the rear end of belt strap 30 extends sufficiently far into the connector 140 to close the front of recess 170; otherwise, the front panel 142 closes the front of recess 170. In any case, the close quarters of the recess 170 assist in maintaining the ends of the loop strip 160 in appropriate interengagement and positioning the loop strip 160 appropriately along the length of the belt strap 30.

The attachment of the loop strip 160 to the connector 140 may be effected in a number of different ways. Preferably, the loop strip 160 first has its ends interengaged, and then the loop 160 slipped onto the connector 140 (with the interengaging elements 162, 164, 166 in recess 170) after the buckle back bar 132, but before the belt strap end. Alternatively, after the belt strap end has been inserted into the connector 140, one end of the open loop strip 160 may be threaded through the recess 170, the ends of the loop strip 160 interconnected outside of the recess 170, and then the loop strip 160 turned about the strap and connector until the interengaging elements 162, 164, 166 thereof enter into the recess 170.

Figure 8A:
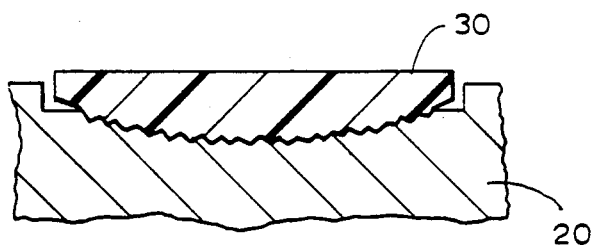
FIGS. 8A, 9A and 10A are fragmentary sectional views illustrating pre-molding operation belt straps placed in mold cavities having different profiles, and FIGS. 8B, 9B and 10B, respectively, illustrate the resulting profiles of the molded belt straps.
Figure 8B:
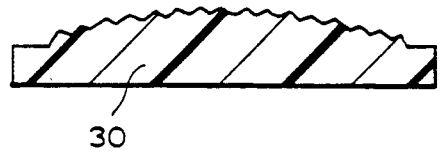
Figure 9A:
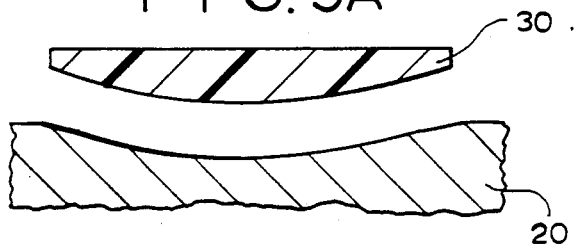
Figure 9B:
Figure 10A:
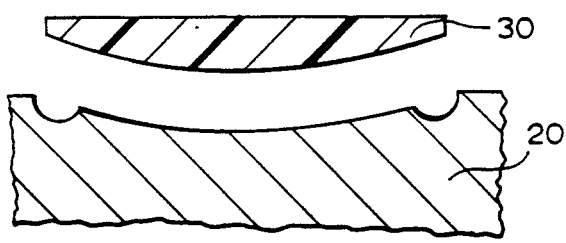
Figure 10B:

By way of example of some of the possible profiles into which the belt straps 30 can be molded, FIGS. 8A and 8B illustrate the molding of a belt strap 30 into a domed or "stuffed center" profile with an irregular or wavy pattern on its face, FIGS. 9A and 9B illustrate the molding of a belt strap 30 into a domed profile with feather edges, and FIGS. 10A and 10B illustrate the molding of a belt strap 30 into a profile characterized by a large central dome and two smaller side domes.

To manufacture the belt of the present invention, extruded or die cut belt straps 30 are placed in the mold cavities 22 of mold 20 at loading station 12 of table 10, and then covered with a release sheet 32 and a sponge 40. The table is then incrememted through heating station 14, cooling station 16 and unloading station 38, where the sponge 40 is removed (and saved for re-use) and the release sheet 32 having the molded belt straps 30 affixed thereto is removed from the mold 20, inverted, and placed on stacking table 76 or directly on conveyor 78. The conveyor 78 transports the subassembly 72, composed of the release sheet 32 and belt straps 30, and optionally the belt loop straps 160, through the finishing operation 79, after which the finished belt straps 30 and optional strips 160 are separated from the release paper 32, the latter being discarded.

Each belt strap 30 is then placed on the table 82 of puncher 80, the front end being longitudinally positioned by the V-shaped slot 86 and the portion to be apertured being laterally centered by slides 102. (The individual punches 100 will have previously been appropriately positioned longitudinally of the belt). The press 112 is then lowered to cause the individual punches 100 to punch belt holes while simultaneously removing the hole impressions 94 created by the molding operation. The back end portion of the apertured belt strap 30 is then connected to a buckle 130 and loop 160 by means of a preformed connector 140 and secured thereto by means of a rivet 154 passing through the connector 140 and belt strap 30.

To summarize, the present invention provides a belt having a plastic strap, formed exclusively of molded plastic, which can simulate the appearance of an expensive leather strap at a minor fraction of the cost of the original. A manufacturing intermediate enables up to 20 belt straps to be carried as a single unit out of the molding process and through the finishing process, thereby enabling the manufacturing cost to be significantly reduced relative to the cost of manufacturing each belt successively. The production method enables the surface detail of the original leather belt strap to be reproduced on the plastic belt straps faithfully, rapidly and inexpensively. The method of the present invention further enables the hole impressions left by the molding process to be removed as part of the belt hole-forming operation. Finally, the present invention provides a connector apparatus for quickly and inexpensively connecting the belt strap and a buckle and a novel loop strip which can be quickly and inexpensively assembled and put in place without requiring expensive sewing or stapling. A belt manufactured according to the present invention is always an exact reproduction of the original leather belt strap being simulated, consistent over time, regardless of the quantity ordered and without regard to inconsistencies in natural leather hides or irregularities in sewing and the like. Due to its mode of construction and the materials used therein, the belt strap is virtually indestructible and not susceptible to delamination.

Now that the preferred embodiments of the present invention have been shown and described in detail, various modifications and improvements thereon will become readily apparent to those skilled in the art. Accordingly, the appended claims are to be construed broadly in a manner consistent with the spirit and scope of the invention herein.

We claim:

1. A belt designed to simulate the appearance of a leather belt comprising:
   (A) an elongate belt strap,
   (B) buckle means having a back bar and being operatively connected to said belt strap adjacent one strap end thereof for operatively fastening said one belt strap end to the other belt strap end, and
   (C) connector apparatus operatively connecting said one belt strap end and said buckle means including a rivet and a metal strip folded back on itself to define a pair of generally parallel front and rear panels and a bight connecting said panels, said strip receiving therein against said bight said back buckle bar and intermediate said panels said one belt strap end, each of the panels containing a rivet aperture therethrough adjacent the free ends thereof, said rivet apertures being aligned and receiving said rivet passing through one belt strap end to operatively join said buckle means and said one belt strap end.

2. The belt of claim 1 wherein said bight and the adjacent ends of said panels together define an open central longitudinal slot enabling a buckle prong to freely pivot on the back buckle bar.

3. The belt of claim 1 additionally including a rivet extending through the one belt strap end and engaging said rivet apertures of said panels for operatively joining said connector and the one belt strap end.

4. The belt of claim 1 additionally including a belt loop having interengaging end portions, wherein said rear panel of said connector apparatus defines a rearwardly extending recess intermediate said bight and said rivet aperture, said belt loop being disposed around said front panel with its end portions interengaged and disposed intermediate said rear panel and said belt strap in said recess.

5. The belt of claim 4 wherein said recess is configured and dimensioned to assist in maintaining said interengaged end portions of said belt loop interengaged and in positioning said belt loop along the length of said belt strap.

6. The belt of claim 5 wherein one of said belt loop end portions defines an aperture and the other of said belt loop end portions defines a full width tip and a restricted width neck, said end portions being interengaged by having said loop end portion neck within said loop end portion aperture.

7. The belt of claim 6 wherein said loop tip is flexible and must be flexed to be inserted through said end portion loop aperture.

8. The belt of claim 1 wherein said buckle means is color- and texture-coordinated with said belt strap.

9. A belt designed to simulate the appearance of a leather belt comprising:
   (A) an elongate belt strap formed substantially exclusively of molded plastic and having its front face and edge substantially uniformly machine finished; and
   (B) fastening means secured to said belt strap adjacent one end thereof for operatively fastening said strap end to the other strap end, said fastening means including
      (i) buckle means having a back bar and being operatively connected to said belt strap adjacent one strap end thereof for operatively fastening said one belt strap end to the other belt strap end, and
      (ii) connector apparatus operatively connecting said one belt strap end and said buckle means, including a rivet and a metal strip folded back on itself to define a pair of generally parallel front and rear panels and a bight connecting said panels, said strip receiving therein adjacent said bight said back buckle bar and intermediate said panels said one belt strap end, each of said panels containing a rivet aperture therethrough adjacent the free ends thereof, said rivet apertures being aligned and receiving said rivet passing through said one belt strap end to operatively join said buckle means and said one belt strap end.

* * * * *